United States Patent Office 3,358,036
Patented Dec. 12, 1967

3,358,036
PURIFICATION OF DIMETHYL SULFOXIDE
Allan Morenberg, Elizabeth, N.J., assignor to Merck & Co., Inc., Rahway, N.J., a corporation of New Jersey
No Drawing. Filed Jan. 27, 1965, Ser. No. 428,542
11 Claims. (Cl. 260—607)

This application is a continuation-in-part of U.S. patent application Ser. No. 351,538, filed on Mar. 12, 1964 and now abandoned.

This invention relates to purification processes and more particularly to purification processes of dimethyl sulfoxide. More specifically, it relates to the removal of pharmaceutically objectionable impurities from dimethyl sulfoxide to result in a pharmaceutically acceptable grade of dimethyl sulfoxide.

Dimethyl sulfoxide, $(CH_3)_2SO$, is a well-known chemical and has been used as a solvent for many materials in industry. The present commercial grades have been suitable for the conventional uses of dimethyl sulfoxide. A recent discovery, however, has prompted an increasing amount of activity directed toward the purification of dimethyl sulfoxide. Specifically, recently it has been reported that dimethyl sulfoxide is useful in a variety of pharmaceutical applications and particularly in the use of topical medicaments. In the latter case, it has been reported that dimethyl sulfoxide acts as a transcutaneous vehicle, whereby the cutaneous transmittal of a medicament is facilitated by providing the medicament in a dimethyl sulfoxide base. Currently available grades of dimethyl sulfoxide possess, to varying degrees, impurities which make them undesirable for use in pharmaceutical applications, among which is a characteristically objectionable odor which seriously affects its aesthetic quality. The impurities exist in the already purified commercially available grades of dimethyl sulfoxide at fairly low levels of concentration, i.e. under 1%. They are undetectable using infrared spectra techniques, the spectrum being the same both for purified and unpurified materials. On the other hand, indications are that ultraviolet absorbancy characteristics are particularly suitable for comparing the relative presence of the impurities.

It is an object of the present invention to provide a process for producing a pharmaceutically aceptable grade of dimethyl sulfoxide.

It is another object of the present invention to provide a dimethyl sulfoxide having a low level of impurities and being substantially odor free.

Yet another object is to provide a process for treating dimethyl sulfoxide having pharmaceutically objectionable impurities to remove a substantial amount of said impurities.

Still a further object is to provide dimethyl sulfoxide in an essentially pharmaceutically-objectionable-impurity free state.

These and other objects will become more apparent when consideration is given to the following detailed disclosure.

The purification process of the present invention, in general, involves the treatment of dimethyl sulfoxide with a first solvent to effect dissolution, treatment of the resulting solution with a second solvent, which is capable of forming a second phase when mixed with said first solvent, thereby forming a second phase and thereby to extract the dimethyl sulfoxide from said first solution, separating the two phases and separating the dimethyl sulfoxide from said second solvent.

The use of the first solvent is effective to provide the dimethyl sulfoxide and the impurities in solution. The use of the second solvent is a critical step and the nature of the second solvent taken in view of the first solvent is likewise critical as will appear hereinafter. This solvent treatment will have the effect of preferentially dissolving the dimethyl sulfoxide in the first solution, removing it therefrom, while leaving behind the impurities in the first solvent phase. Separation of the second solvent from the dimethyl sulfoxide, when effected in the preferred manner hereinafter appearing, purifies further the dimethyl sulfoxide.

As can be seen from the above, the nature of each of the solvents used in the first step of the process is dependent, one upon the other, to achieve the desired distribution of dimethyl sulfoxide and impurities in the system. Thus, the first criterion is that the solvents must be capable of forming a two-phase system with each other. Secondly, the second solvent must have a higher solvent distribution coefficient relative to the dimethyl sulfoxide than that of the first solvent. The reverse of this is also true that the distribution coefficient relative to the impurities of the dimethyl sulfoxide for the second solvent is much lower than that of the first solvent. When the solvents have been selected on these bases, a well-mixed mixture of first solvent, second solvent, and impure dimethyl sulfoxide, allowed to stand until the two phases appear, will have one phase comprising the first solvent, a major proportion of the impurities originally present in the dimethyl sulfoxide, and a small amount of dimethyl sulfoxide; and a second phase comprising the second solvent, a major proportion of dimethyl sulfoxide originally in the first solvent, and a minor proportion of dimethyl sulfoxide impurities.

It has been discovered that the objects of this invention are achieved when the first solvent is an organic solvent selected from the group consisting of halogenated paraffin hydrocarbons, aromatic hydrocarbons, halogenated aromatci hydrocarbons, lower alkyl derivatives of aromatic hydrocarbons wherein the alkyl group contains between about 1 to about 4 carbon atoms, esters and ethers and the second solvent is water. These materials constitute the preferred solvents of the present invention.

With regard to the amounts of solvents to be employed, neither requires the use of any specific proportion to achieve impurity separation. However, in selecting the amounts, certain criteria should be followed in order to obtain maximum benefit from the process. With particular regard to the first solvent, for example, on the low side enough solvent should be used such that upon subsequent extraction with the second solvent two distinct liquid phases are formed. On the high side, it is advantageous for technical reasons to use as much solvent as possible, although this will be typically controlled by economics and space. For the preferred organic solvents of the present invention, it is suitable to use from one to ten volumes thereof per volume of dimethyl sulfoxide being treated. The preferred amount is from two to four volumes per volume of dimethyl sulfoxide.

With regard to the amount of second solvent to be used in extracting the dimethyl sulfoxide from the first solvent-dimethyl sulfoxide solution, as little may be used as will be sufficient to remove enough of the dimethyl sulfoxide to be consistent with good economics, with the minimum amount being that sufficient to form a second phase with the first solvent. Large amounts of second solvent in a single extraction pass should be avoided since such practice would tend to extract an unduly large percentage of impurities as well. With respect to the latter point, it is much more preferable to use relatively small amounts of second solvent in repeated extraction passes; enough for example, to remove from 80 to 90% of the dimethyl sulfoxide present in the organic solvent system, or whatever recovery is desired in view of the economics involved. This preferred practice will have the effect of maintaining a favorable equilibrium between impurity in the first solvent phase and dimethyl sulfoxide in the second solvent phase such that much less impurity will be extracted upon repeated extractions with small volumes than would be removed in a one-step extraction with a large amount of water. For the preferred second solvent, water, it will be suitable to use from about 0.25–3 volumes of water per volume of dimethyl sulfoxide with 0.5–1.5 volumes being preferred with three repetitions of the extraction.

After the two-phase solvent system has been adequately mixed, and the extraction has been repeated to the satisfaction of yield and recovery requirements, the second solvent phase, in the preferred case the water phase, containing the purified dimethyl sulfoxide, is separated from the organic solvent phase. What is then on hand is a solution of purified dimethyl sulfoxide. Where such a solution is desired or suitable for use, as it may be in the case of an aqueous solution, it is available without any further processing, except possibly solvent degassing. Where, however, it is desired to remove the solvent phase, as it may be for some solvent other than water, or even for water where certain pharmaceutical applications require essential absence of water, the solution may be treated in any conventional manner to remove the solvent.

It is an added feature of the present invention, however, and in fact a preferred embodiment thereof, to effect the separation of second solvent, in the preferred case water, from dimethyl sulfoxide in a particular manner to obtain an even higher degree of purity than is obtained in practicing the extraction step solely. This preferred manner, described in terms of the preferred materials, contemplates most preferably initially bulk evaporating a major portion of the water from the water-dimethyl sulfoxide solution. This may be done in any suitable vacuum concentrating equipment and is merely employed to minimize the capacity requirements of the equipment used in the separation step. After the material is concentrated to a suitable water content, for example one corresponding to a solution having a vapor temperature of about 85° C. at 2 to 3 inches of mercury, the resulting solution is vacuum fractionated to remove the remaining part of the water. In this regard, it has been discovered that suitable separation is effected, and no further impurities are formed in the material under such temperature and pressure conditions that the bottoms temperature does not go above 108° C. and preferably stays between 80 and 100° C. For example, using a 5–10 plate apparatus at a vacuum of 10 mm., material may be obtained boiling in the range of from 76–78° C. which, when condensed, has a water content of less than 0.1 g./ml. Actually, the column operation can be adjusted to yield any desired water content, a factor largely within the control of individual processors.

As a result of carrying out the foregoing preferred step, there is obtained a dimethyl sulfoxide distillate overhead which has a U.V. absorbance at 290 millimicrons of generally less than about 0.10, representing an even higher purity material than that obtained in the extraction step alone. The final bottoms content has a U.V. absorbance at 290 millimicrons of as high as 2.5, thus indicating a good separation of impurities.

Comparison of the various materials produced by the process of the present invention against impure starting material and material purified by other methods are made using U.V. absorbance techniques. As indicated hereinabove, other analytical techniques have not been found to be suitable. The comparison is made at a wave length of 290 millimicrons using air as a standard. This wave length is chosen because the U.V. absorbance curve obtained on a sample of crude dimethyl sulfoxide, using the purified dimethyl sulfoxide obtained according to the instant process as a standard, shows a peak at 290 millimicrons, thus indicating a maximum absorbance for the impurity at that point. This figure then, when used for various samples of dimethyl sulfoxide, gives a convenient reference point for determining relative purity. With respect to other methods of purification, when the same impure starting material is submitted to charcoal treatment with or without fractional distillation, there results a material having a very strong pungent odor and a U.V. absorbance of 0.44 at 290 millimicrons. Similarly, direct distillation of the starting material yields a distillate having a U.V. absorbance at 290 millimicrons of 0.25 and some odor. Even a ten plate apparatus direct distillation yields a distillate with a U.V. absorbance at 290 millimicrons of 0.11 and some odor. These results may be compared with purified material obtained in the process of the present invention wherein almost no odor is detectable and wherein the U.V. absorbance at 290 millimicrons is of the order of less than 0.10.

Since specific embodiments of the present invention have been named and described, it will be apparent to those skilled in the art that changes may be made in the detail of the percentages, ranges, and ingredients of the process of the present invention without departing from the spirit of the present invention or the scope intended. The following examples are given for purposes of illustration and not by way of limitation.

*Example 1*

One liter of commercially obtained technical grade dimethyl sulfoxide having an odor and a U.V. absorbance of 0.25 at 290 millimicrons is dissolved in 3 liters of chloroform at room temperature. The resultant solution is agitated to insure uniformity and then treated with 1 liter of water. The resultant mixture is agitated and allowed to settle into two phases. The water phase is separated and reserved. The chloroform layer is then again treated a second time with 1 liter of water as above and the water layer separated. This water layer is combined with the first water extract layer and washed three times with 80 cc. of chloroform. After each washing, the chloroform layer is separated and discarded. The washed water extract constituting 2,890 cc. volume is then concentrated under 2 to 3 inches of mercury pressure down to 800 cc. During the concentration, the temperature of the batch rises to 85° C. The batch has a final water concentration of 36.4 mg./ml. and essentially no odor.

The concentrate is then removed to a 2 inch I.D. column packed with 10 inches of stainless steel Pennsylvania State packing and is vacuum fractionated under 10 mm. mercury pressure. The column is heated and the distillate is taken in cuts. The U.V. absorbance at 290 for each cut is shown in the following Table 1.

TABLE 1

| Cut | Vacuum, mm. | Vapor Temp., ° C. | Pot Temp., ° C. | Reflux Ratio | Vol., cc. | Assays U.V. 290 | Assays KF, mg./ml. |
|---|---|---|---|---|---|---|---|
| 1 | 10 | 45–70 | 74–82 | 0 | 58 | | |
| 2 | 10–8 | 70–77 | 82–83 | 3/1 | 74 | | 85.7 |
| 3 | 8 | 77–78 | 83–82 | 3/1 | 234 | .070 | 1.2 |
| 4 | 8 | 78–79 | 82–82 | 3/1 | 218 | .075 | 0.4 |

As can be seen from the data above, the dimethyl sulfoxide which was collected during the distillation shows an emphatic decrease in the U.V. absorbance at 290 millimicrons as compared to the starting material. The starting material had a U.V. at 290 of 0.25 and the dimethyl sulfoxide recovered from the distillation showed a U.V. at 290 ranging from 0.070 to 0.075.

*Example 2*

One liter of commercially obtained technical grade dimethyl sulfoxide having an odor and a U.V. absorbance of 0.25 at 290 millimicrons is dissolved in 3 liters of carbon tetrachloride at room temperature. The resultant solution is agitated to insure uniformity and then treated with 1 liter of water. The resultant mixture is agitated and allowed to settle into two phases. The water phase is separated and reserved. The carbon tetrachloride layer is then again treated a second time with 1 liter of water as above and the water layer separated. This water layer is combined with the first water extract layer and washed three times with 80 cc. of carbon tetrachloride. After each washing, the carbon tetrachloride layer is separated and discarded. The washed water extract constituting 2,940 cc. volume is then concentrated under 2 to 3 inches of mercury pressure down to 830 cc. During the concentration, the temperature of the batch rises to 85° C. The batch has a final water concentration of 1.5 mg./ml. and essentially no odor.

The concentrate is then removed to a 2 inch I.D. column packed with 10 inches of stainless steel Pennsylvania State packing and is vacuum fractionated under 10 mm. mercury pressure. The column is heated and the distillate is taken in cuts. The U.V. absorbance at 290 for each cut is shown in the following Table 2.

TABLE 2

| Cut | Vacuum, mm. | Vapor Temp., °C. | Pot Temp., °C. | Reflux Ratio | Vol., cc. | Assays | |
|---|---|---|---|---|---|---|---|
| | | | | | | U.V. 290 | KF, mg./ml. |
| 1 | 10 | 45–67.5 | 75–81 | 0 | 38 | | |
| 2 | 10 | 67.5–78 | 81–83 | 3/1 | 50 | | 136.2 |
| 3 | 10–8 | 78–78 | 83–82 | 3/1 | 224 | 0.08 | 3.0 |
| 4 | 8 | 78–78 | 82–81 | 3/1 | 232 | 0.09 | 1.6 |

As can be seen from the data above, the dimethyl sulfoxide which was collected during the distillation shows an emphatic decrease in the U.V. absorbance at 290 millimicrons as compared to the starting material. The starting material had a U.V. at 290 of 0.25 and the dimethyl sulfoxide recovered from the distillation showed a U.V. at 290 ranging from 0.080 to 0.090.

*Example 3*

One liter of commercially obtained technical grade dimethyl sulfoxide having an odor and a U.V. absordance of 0.25 at 290 millimicrons is dissolved in 3 liters of methylene chloride at room temperature. The resultant solution is agitated to insure uniformity and then treated with 1 liter of water. The resultant mixture is agitated and allowed to settle into two phases. The water phase is separated and reserved. The methylene chloride layer is then again treated a second time with 1 liter of water as above and the water layer separated. This water layer is combined with the first water extract layer and washed three times with 80 cc. of methylene chloride. After each washing, the methylene chloride layer is separated and discarded. The washed water extract constituting 2,940 cc. volume is then concentrated under 2 to 3 inches of mercury pressure down to 850 cc. During the concentration, the temperature of the batch rises to 85° C. The batch has a final water concentration of 33.0 mg./ml. and essentially no odor.

The concentrate is then removed to a 2 inch I.D. column packed with 10 inches of stainless steel Pennsylvania State packing and is vacuum fractionated under 10 mm. mercury pressure. The column is heated and the distillate is taken in cuts. The U.V. absorbance at 290 for each cut is shown in the following Table 3.

TABLE 3

| Cut | Vacuum, mm. | Vapor Temp., °C. | Pot Temp., °C. | Reflux Ratio | Vol., cc. | Assays | |
|---|---|---|---|---|---|---|---|
| | | | | | | U.V. 290 | KF, mg./ml. |
| 1 | 10 | 35–67 | 72–82 | 0–3/1 | 55 | | |
| 2 | 10–8 | 67–76 | 82–82 | 3/1 | 90 | | 50.7 |
| 3 | 8–7 | 76–76 | 82–80 | 3/1 | 270 | .085 | 2.7 |
| 4 | 7 | 76–77 | 80–80 | 3/1 | 248 | .070 | 1.5 |

As can be seen from the data above, the dimethyl sulfoxide which was collected during the distillation shows an emphatic decrease in the U.V. absorbance at 290 millimicrons as compared to the starting material. The starting material had a U.V. at 290 of 0.25 and the dimethyl sulfoxide recovered from the distillation showed a U.V. at 290 ranging from 0.085 to 0.070.

*Example 4*

One liter of commercially obtained technical grade dimethyl sulfoxide having an odor and a U.V. absorbance of 0.25 at 290 millimicrons is dissolved in 3 liters of ethylene dichloride at room temperature. The resultant solution is agitated to insure uniformity and then treated with 1 liter of water. The resultant mixture is agitated and allowed to settle into two phases. The water phase is separated and reserved. The ethylene dichloride layer is then again treated a second time with 1 liter of water as above and the water layer separated. This water layer is combined with the first water extract layer and washed three times with 80 cc. of ethylene dichloride. After each washing, the ethylene dichloride layer is separated and discarded. The washed water extract constituting 2,970 cc. volume is then concentrated under 2 to 3 inches of mercury pressure down to 830 cc. During the concentration, the temperature of the batch rises to 85° C. The batch has a final water concentration of 24.0 mg./ml. and essentially no odor.

The concentrate is then removed to a 2 inch I.D. column packed with 10 inches of stainless steel Pennsylvania State packing and is vacuum fractionated under 10 mm. mercury pressure. The column is heated and the distillate is taken in cuts. The U.V. absorbance at 290 for each cut is shown in the following Table 4.

TABLE 4

| Cut | Vacuum, mm. | Vapor Temp., °C. | Pot Temp., °C. | Reflux Ratio | Vol., cc. | Assays | |
|---|---|---|---|---|---|---|---|
| | | | | | | U.V. 290 | KF, mg./ml. |
| 1 | 10 | 43–68 | 76–82 | 0 | 46 | | |
| 2 | 10 | 68–78 | 82–83 | 3/1 | 48 | | 110.0 |
| 3 | 10–8 | 78–78 | 83–83 | 3/1 | 250 | 0.10 | 1.8 |
| 4 | 8 | 78–78 | 83–81 | 3/1 | 248 | 0.09 | 0.6 |

As can be seen from the data above, the dimethyl sulfoxide which was collected during the distillation shows an emphatic decrease in the U.V. absorbance at 290 millimicrons as compared to the starting material. The starting material had a U.V. at 290 of 0.25 and the dimethyl sulfoxide recovered from the distillation showed a U.V. at 290 ranging from 0.100 to 0.090.

*Example 5*

One liter of commercially obtained technical grade dimethyl sulfoxide having an odor and a U.V. absorbance of 0.25 at 290 millimicrons is dissolved in 3 liters of benzene at room temperature. The resultant solution is agitated to insure uniformity and then treated with 1 liter of water. The resultant mixture is agitated and allowed to settle into two phases. The water phase is separated and reserved. The benzene layer is then again treated a second time with 1 liter of water as above and the water layer separated. This water layer is combined with the first water extract layer and washed three times with 80 cc. of benzene. After each washing, the benzene layer is separated and discarded. The washer water extract constituting 2,950 cc. volume is then concentrated under 2 to 3 inches of mercury pressure down to 835 cc. During the concentration, the temperature of the batch rises to 85° C. The batch has a final water concentration of 22.0 mg./ml. and essentially no odor.

The concentrate is then removed to a 2 inch I.D. column packed with 10 inches of stainless steel Pennsylvania State packing and is vacuum fractionated under 10 mm. mercury pressure. The column is heated and the distillate is taken in cuts. The U.V. absorbance at 290 for each cut is shown in the following Table 5.

TABLE 5

| Cut | Vacuum, mm. | Vapor Temp., °C. | Pot Temp., °C. | Reflux Ratio | Vol., cc. | Assays | |
|---|---|---|---|---|---|---|---|
| | | | | | | U.V. 290 | KF, mg./ml. |
| 1 | 10 | 54-74 | 75-84 | 0 | 160 | | |
| 2 | 10 | 74-77 | 84-83 | 3/1 | 65 | | 13.4 |
| 3 | 10-8 | 77-77.5 | 83-83 | 3/1 | 234 | 0.09 | 0.5 |
| 4 | 8 | 77.5-78 | 83-82 | 3/1 | 252 | 0.08 | 0.2 |

As can be seen from the data above, the dimethyl sulfoxide which was collected during the distillation shows an emphatic decrease in the U.V. absorbance at 290 millimicrons as compared to the starting material. The starting material had a U.V. at 290 of 0.25 and the dimethyl sulfoxide recovered from the distillation showed a U.V. at 290 ranging from 0.090 to 0.080.

*Example 6*

One liter of commercially obtained technical grade dimethyl sulfoxide having an odor and a U.V. absorbance of 0.25 at 290 millimicrons is dissolved in 3 liters of xylene at room temperature. The resultant solution is agitated to insure uniformity and then treated with 1 liter of water. The resultant mixture is agitated and allowed to settle into two phases. The water phase is separated and reserved. The xylene layer is then again treated a second time with 1 liter of water as above and the water layer separated. This water layer is combined with the first water extract layer and washed three times with 80 cc. of xylene. After each washing the xylene layer is separated and discarded. The washed water extract constituting 2,940 cc. volume is then concentrated under 2 to 3 inches of mercury pressure down to 830 cc. During the concentration, the temperature of the batch rises to 85° C. The batch has a final water concentration of 27.0 mg./ml. and essentially no odor.

The concentrate is then removed to a 2 inch I.D. column packed with 10 inches of stainless steel Pennsylvania State packing and is vacuum fractionated under 10 mm. mercury pressure. The column is heated and the distillate is taken in cuts. The U.V. absorbance at 290 for each cut is shown in the following Table 6.

TABLE 6

| Cut | Vacuum, mm. | Vapor Temp., °C. | Pot Temp., °C. | Reflux Ratio | Vol., cc. | Assays | |
|---|---|---|---|---|---|---|---|
| | | | | | | U.V. 290 | KF, mg./ml. |
| 1 | 10 | 46-67.5 | 71-84 | 3/1 | 50 | | |
| 2 | 10 | 67.5-77 | 84-84 | 3/1 | 18 | | 133.0 |
| 3 | 10-7.5 | 77-78 | 84-82 | 3/1 | 256 | .095 | 3.4 |
| 4 | 7.5 | 78-78 | 82-82 | 3/1 | 253 | .090 | 0.8 |

As can be seen from the data above, the dimethyl sulfoxide which was collected during the distillation shows an emphatic decrease in the U.V. absorbance at 290 millimicrons as compared to the starting material. The starting material had a U.V. at 290 of 0.25 and the dimethyl sulfoxide recovered from the distillation showed a U.V. at 290 ranging from 0.095 to 0.090.

*Example 7*

One liter of commercially obtained technical grade dimethyl sulfoxide having an odor and a U.V. absorbance of 0.25 at 290 millimicrons is dissolved in 3 liters of bromobenzene at room temperature. The resultant solution is agitated to insure uniformity and then treated with 1 liter of water. The resultant mixture is agitated and allowed to settle into two phases. The water phase is separated and reserved. The bromobenzene layer is then again treated a second time with 1 liter of water as above and the water layer separated. This water layer is combined with the first water extract layer and washed three times with 80 cc. of bromobenzene. After each washing, the bromobenzene layer is separated and discarded. The washed water extract constituting 2,930 cc. volume is then concentrated under 2 to 3 inches of mercury pressure down to 810 cc. During the concentration, the temperature of the batch rises to 85° C. The batch has a final water concentration of 14.4 mg./ml. and essentially no odor.

The concentrate is then removed to a 2 inch I.D. column packed with 10 inches of stainless steel Pennsylvania State packing and is vacuum fractionated under 10 mm. mercury pressure. The column is heated and the distillate is taken in cuts. The U.V. absorbance at 290 for each cut is shown in the following Table 7.

TABLE 7

| Cut | Vacuum, mm. | Vapor Temp., °C. | Pot Temp., °C. | Reflux Ratio | Vol., cc. | Assays | |
|---|---|---|---|---|---|---|---|
| | | | | | | U.V. 290 | KF, mg./ml. |
| 1 | 10 | 50-70 | 79-80 | 0 | 65 | | |
| 2 | 10-8 | 70-75 | 80-82 | 3/1 | 50 | | 63.0 |
| 3 | 8 | 75-77 | 82-82 | 3/1 | 190 | 0.10 | 1.0 |
| 4 | 8-7 | 77-78 | 82-84 | 3/1 | 195 | 0.10 | 0.3 |

As can be seen from the data above, the dimethyl sulfoxide which was collected during the distillation shows an emphatic decrease in the U.V. absorbance at 290 millimicrons as compared to the starting material. The starting material had a U.V. at 290 of 0.25 and the dimethyl sulfoxide recovered from the distillation showed a U.V. at 290 of 0.10.

*Example 8*

One liter of commercially obtained technical grade dimethyl sulfoxide having an odor and a U.V. absorbance of 0.25 at 290 millimicrons is dissolved in 3 liters of ethyl acetate at room temperature. The resultant solution is agitated to insure uniformity and then treated with 1 liter of water. The resultant mixture is agitated and allowed to settle into two phases. The water phase is separated and reserved. The ethyl acetate layer is then again treated a second time with 1 liter of water as above and the water layer separated. This water layer is combined with the first water extract layer and washed three times with 80 cc. of ethyl acetate. After each washing, the ethyl acetate layer is separated and discarded. The washed water extract constituting 3,160 cc. volume is then concentrated under 2 to 3 inches of mercury pressure down to 860 cc. During the concentration, the temperature of the batch rises to 85° C. The batch has a final water concentration of 24.6 mg./ml. and essentially no odor.

The concentrate is then removed to a 2 inch I.D. column packed with 10 inches of stainless steel Pennsylvania State packing and is vacuum fractionated under 10 mm. mercury pressure. The column is heated and the distillate is taken in cuts. The U.V. absorbance at 290 for each cut is shown in the following Table 8.

TABLE 8

| Cut | Vacuum, mm. | Vapor Temp., °C. | Pot Temp., °C. | Reflux Ratio | Vol., cc. | Assays | |
|---|---|---|---|---|---|---|---|
| | | | | | | U.V. 290 | KF, mg./ml. |
| 1 | 10 | 55-70 | 71-78 | 0 | 44 | | |
| 2 | 10 | 70-78 | 78-84 | 3/1 | 80 | | 92.0 |
| 3 | 10-7 | 78-77 | 84-81 | 3/1 | 234 | 0.10 | 1.8 |
| 4 | 7 | 77-77 | 81-81 | 3/1 | 222 | 0.09 | 0.5 |

As can be seen from the data above, the dimethyl sulfoxide which was collected during the distillation shows an emphatic decrease in the U.V. absorbance at 290 millimicrons as compared to the starting material. The starting material had a U.V. at 290 of 0.25 and the dimethyl sulfoxide recovered from the distillation showed a U.V. at 290 ranging from 0.10 to 0.09.

Example 9

One liter of commercially obtained technical grade dimethyl sulfoxide having an ordor and a U.V. absorbance of 0.25 at 290 millimicrons is dissolved in 3 liters of ethyl ether at room temperature. The resultant solution is agitated to insure uniformity and then treated with 1 liter of water. The resultant mixture is agitated and allowed to settle into two phases. The water phase is separated and reserved. The ethyl ether layer is then again treated a second time with 1 liter of water as above and the water layer separated. This water layer is combined with the first water extract layer and washed three times with 80 cc. of ethyl ether. After each washing, the ethyl ether layer is separated and discarded. The washed water extract constituting 3,025 cc. volume is then concentrated under 2 to 3 inches of mercury pressure down to 850 cc. During the concentration, the temperature of the batch rises to 85° C. The batch has a final water concentration of 27.0 mg./ml. and essentially no odor.

The concentrate is then removed to a 2 inch I.D. column packed with 10 inches of stainless steel Pennsylvania State packing and is vacuum fractionated under 10 mm. mercury pressure. The column is heated and the distillate is taken in cuts. The U.V. absorbance at 290 for each cut is shown in the following Table 9.

TABLE 9

| Cut | Vacuum, mm. | Vapor Temp., °C. | Pot Temp., °C. | Reflux Ratio | Vol., cc. | Assays U.V. 290 | Assays KF, mg./ml. |
|---|---|---|---|---|---|---|---|
| 1 | 10 | 50–70 | 72–78 | 0 | 30 | | |
| 2 | 10 | 70–78 | 78–81 | 3/1 | 90 | | 125.0 |
| 3 | 10–7.5 | 78–76 | 81–81 | 3/1 | 185 | 0.12 | 1.9 |
| 4 | 7.5 | 76–77 | 81–80 | 3/1 | 280 | 0.10 | 1.0 |

As can be seen from the data above, the dimethyl sulfoxide which was collected during the distillation shows an emphatic decrease in the U.V. absorbance at 290 millimicrons as compared to the starting material. The starting material had a U.V. at 290 of 0.25 and the dimethyl sulfoxide recovered from the distillation showed a U.V. at 290 ranging from 0.12 to 0.10.

I claim:
1. The method which comprises:
   (a) treating dimethyl sulfoxide having a substantial amount of impurities, evidenced by a strong odor and by a U.V. absorbance, at a wave length of 290 millimicrons, of a much greater value than 0.10 using air as a standard, with an organic solvent selected from the group consisting of halogenated paraffin hydrocarbons, aromatic hydrocarbons, halogenated aromatic hydrocarbons, lower alkyl derivatives of aromatic hydrocarbons wherein the alkyl group contains between about 1 to about 4 carbon atoms, esters and ethers, thereby to form an organic solvent solution of said dimethyl sulfoxide;
   (b) adding water to said organic solvent solution and intimately contacting said organic solvent solution with said water to form a uniform mixture, whereby dimethyl sulfoxide is extracted from said organic solvent solution into said water, forming thereby a water extract solution of dimethyl sulfoxide;
   (c) allowing said mixture to settle into a distinct organic solvent phase and a distinct water extract phase containing dimethyl sulfoxide;
   (d) separating said water extract phase from said organic solvent phase; and
   (e) fractionally distilling said water extract phase under distillation conditions such that the liquid bottoms temperature does not exceed 108° C., thereby to produce, at an appropriate distillation temperature, a distillate which is dimethyl sulfoxide having almost no odor and a U.V. absorbance at a wave length of 290 millimicrons of less than 0.10, using air as a standard.

2. The method which comprises:
   (a) treating dimethyl sulfoxide having a substantial amount of impurities, evidenced by a strong odor and by a U.V. absorbance, at a wave length of 290 millimicrons, of a much greater value than 0.10, using air as a standard, with an organic solvent selected from the group consisting of chloroform, carbon tetrachloride, methylene chloride, ethylene dichloride, benzene, xylene, bromobenzene, ethylacetate and ethyl ether, thereby to form an organic solvent solution of said dimethyl sulfoxide;
   (b) adding water to said organic solvent solution and intimately contacting said organic solvent solution with said water to form a uniform mixture, whereby dimethyl sulfoxide is extracted from said organic solvent solution into said water, forming thereby a water extract solution of dimethyl sulfoxide;
   (c) allowing said mixture to settle into a distinct organic solvent phase and a distinct water extract phase containing dimethyl sulfoxide;
   (d) separating said water extract phase from said organic solvent phase; and
   (e) fractionally distilling said water extract phase under distillation conditions such that the liquid bottoms temperature is maintained between 80° C. and 100° C., thereby to produce, at an appropriate distillation temperature, in said range of temperatures, a distillate which is dimethyl sulfoxide having almost no odor and a U.V. absorbance at a wave length of 290 millimicrons of less than 0.10, using air as a standard.

3. The method according to claim 2 wherein the organic solvent is chloroform.

4. The method according to claim 2 wherein the organic solvent is carbon tetrachloride.

5. The method according to claim 2 wherein the organic solvent is methylene chloride.

6. The method according to claim 2 wherein the organic solvent is ethylene dichloride.

7. The method according to claim 2 wherein the organic solvent is benzene.

8. The method according to claim 2 wherein the organic solvent is xylene.

9. The method according to claim 2 wherein the organic solvent is bromobenzene.

10. The method according to claim 2 wherein the organic solvent is ethyl acetate.

11. The method according to claim 2 wherein the organic solvent is ethyl ether.

References Cited

UNITED STATES PATENTS 3,154,576  10/1964  Fainman _____ 260—504

OTHER REFERENCES

Rosenbaum et al., JAMA, vol. 192, No. 4, Apr. 26, 165, pp. 109–113.

Federal Register, vol. 30, No. 228, p. 14639.

Kharasch, Organic Sulfur Compounds, vol. 1, p. 176 (1961).

Weissberger, Separation and Purification, vol. III, pt. 1, pp. 150, 301, 302.

CHARLES B. PARKER, *Primary Examiner.*

D. R. PHILLIPS, *Assistant Examiner.*